United States Patent
Held et al.

(10) Patent No.: US 12,420,793 B2
(45) Date of Patent: Sep. 23, 2025

(54) METHOD AND CONTROL ARRANGEMENT FOR CONTROLLING A SPEED OF A VEHICLE IN A DOWNHILL ROAD SECTION FOLLOWED BY AN UPHILL ROAD SECTION

(71) Applicant: Scania CV AB, Södertälje (SE)

(72) Inventors: Manne Held, Älvsjö (SE); Mikael Alenius, Segeltorp (SE)

(73) Assignee: Scania CV AB, Södertälje (SE)

( * ) Notice: Subject to any disclaimer, the term of this patent is extended or adjusted under 35 U.S.C. 154(b) by 311 days.

(21) Appl. No.: 18/203,190

(22) Filed: May 30, 2023

(65) Prior Publication Data
US 2023/0398989 A1 Dec. 14, 2023

(30) Foreign Application Priority Data
Jun. 14, 2022 (SE) .................................... 2250712-3

(51) Int. Cl.
*B60W 10/18* (2012.01)
*B60W 10/08* (2006.01)
*B60W 30/18* (2012.01)
*B60W 40/06* (2012.01)

(52) U.S. Cl.
CPC ...... *B60W 30/18009* (2013.01); *B60W 10/08* (2013.01); *B60W 10/18* (2013.01); *B60W 40/06* (2013.01); B60W 2510/087 (2013.01); B60W 2720/10 (2013.01)

(58) Field of Classification Search
CPC ............. B60W 2552/15; B60W 10/18; B60W 2510/184; B60W 2552/20; B60W 30/1843; B60L 2240/642; B60L 15/2018; B60T 2201/04
See application file for complete search history.

(56) References Cited

U.S. PATENT DOCUMENTS

| | | | |
|---|---|---|---|
| 10,065,641 B2 * | 9/2018 | Fraser | B60W 10/06 |
| 2007/0112475 A1 | 5/2007 | Koebler et al. | |
| 2009/0088294 A1 | 4/2009 | West et al. | |
| 2015/0027823 A1 * | 1/2015 | Murata | B60T 7/12 188/162 |
| 2021/0237728 A1 * | 8/2021 | Wessel | B60W 30/18109 |
| 2024/0367653 A1 * | 11/2024 | Larsson | B62D 35/001 |

FOREIGN PATENT DOCUMENTS

JP 2007244072 A 9/2007

* cited by examiner

*Primary Examiner* — Kenneth J Malkowski
(74) *Attorney, Agent, or Firm* — Moore & Van Allen PLLC; W. Kevin Ransom

(57) ABSTRACT

Disclosed is a method for controlling a speed of a vehicle in a downhill road section followed by an uphill road section. The vehicle comprising an electrical machine system for applying braking to the vehicle to maintain a first vehicle speed in the downhill road section and to apply a propelling power in the uphill road section. The method comprising determining whether a temperature of the electrical machine system will exceed a temperature limit in the uphill road section, if maintaining the first vehicle speed in the downhill road section, and if so, reducing the first vehicle speed to a second vehicle speed in the downhill road section such that, in comparison to when the first vehicle speed would have been maintained, the temperature of the electrical machine system is decreased when the vehicle reaches the uphill road section and a travelling time in the downhill road section is increased.

14 Claims, 5 Drawing Sheets

METHOD AND CONTROL ARRANGEMENT FOR CONTROLLING A SPEED OF A VEHICLE IN A DOWNHILL ROAD SECTION FOLLOWED BY AN UPHILL ROAD SECTION

CROSS-REFERENCE TO RELATED APPLICATIONS

This application claims priority to Swedish Patent Application No. 2250712-3 filed Jun. 14, 2022, of the same title; the contents of which is hereby incorporated by reference.

TECHNICAL FIELD

The invention relates to a method and a control arrangement for controlling a speed of a vehicle travelling on a downhill road section followed by an uphill road section.

The invention also relates to a computer program and a computer-readable medium and a vehicle comprising such a control arrangement.

BACKGROUND

The following background description constitutes a description of the background to the invention, which does not, however, necessarily have to constitute prior art.

One of the global challenges today is reducing the negative impacts of road transportation on the environment due to greenhouse gas emissions. Moreover, in motor vehicles, such as cars, trucks and buses, the cost of fuel constitutes a significant expense for the vehicle's owner or user. This has led to an increased interest in vehicle electrification. The powertrain of vehicles powered at least partly by electrical power, i.e. electric and hybrid vehicles, comprises an electrical machine system to efficiently and reliably deliver a propulsion power to propel the vehicle at a required speed as well as a brake power to brake the vehicle efficiently and safely when required.

The performance of the electrical machine system is limited for one or more reasons for example by its thermal capability. The electrical machine system in a vehicle will operate efficiently and safely within its safe operating temperature range. A safe operating temperature range is often delimited by a maximum operating temperature in one or more components of the system. When exposed to temperatures above the maximum operating temperature, the lifetime of the components of the electric machine system may decrease. Too high temperatures may also lead to component failure.

SUMMARY

It is an objective of the present invention to provide a method and a control arrangement for mitigating or solving drawbacks of conventional solutions. In particular an objective of the present invention is to provide a solution for controlling a speed of a vehicle travelling on a downhill road section such that an improved vehicle performance may be obtained.

According to a first aspect of the invention, aforementioned and further objectives are achieved through a method performed by a control arrangement for controlling a speed of a vehicle in a downhill road section followed by an uphill road section, the vehicle comprising an electrical machine system being configured to apply a brake power for braking the vehicle to maintain a first vehicle speed in the downhill road section, and to apply a propelling power for propelling the vehicle in the uphill road section, the method comprising:
 determining whether a temperature of the electrical machine system will exceed a temperature limit in the uphill road section, if maintaining the first vehicle speed in the downhill road section, and when it is determined that the temperature will exceed the temperature limit in the uphill road section:
 reducing the first vehicle speed to a second vehicle speed in the downhill road section such that, in comparison to when the first vehicle speed would have been maintained, the temperature of the electrical machine system is decreased when the vehicle reaches the uphill road section resulting from a travelling time in the downhill road section being increased.

The invention relates thus to a method for automatically controlling the speed of a vehicle powered by an electrical machine system travelling on a downhill road section followed by an uphill road section. Examples of such vehicles are battery electric vehicles, hybrid electric vehicles, and plug-in hybrid electric vehicles.

An electrical machine system may here comprise an electrical machine, power electronics and a related battery system. The temperature in the components of the electrical machine system will vary over time depending mainly on the power applied by the electrical machine system when propelling or brake power is provided from the electrical machine in the vehicle to the vehicle's drive wheel when the vehicle is in motion. Increased power outtake from the electrical machine results in increased temperature in one or more components of the electrical machine system. Thus, the temperature of the electrical machine system may here be understood as a temperature of one or more components of the electrical machine system.

The vehicle may be configured to maintain a predefined maximum downhill speed, here referred to as the first vehicle speed. The predefined maximum downhill speed may be e.g., selected automatically or by the driver of the vehicle and should not be exceeded. The invention, on the other hand, controls the speed of the vehicle if it is determined that a temperature of the electrical machine system will exceed a temperature limit in the uphill road section when the first vehicle speed is maintained in the downhill road section. Instead of maintaining the first vehicle speed as in previously known methods, a second vehicle speed, lower that the first vehicle speed, is maintained in the downhill section by applying a brake power by means of an electrical machine in the vehicle when the second vehicle speed has been reached. By maintaining a lower speed, the travelling time in the downhill road section is increased and the mean brake power, which is required as the vehicle travels downhill, is reduced. Generally, some of the energy applied by the vehicle's electrical machine during braking is regenerated. Energy recovery is generally more efficient when performed at lower power and during an increased time, as in the method according to the invention. Thus, more energy may be recovered in the downhill road section compared to previously known methods.

The temperature of the electrical machine system exceeding a temperature limit may here be understood as the temperature of the electrical machine system exceeding the temperature limit when the vehicle speed is controlled to maintain a configured speed of a speed control system, such as a cruise control system or a downhill speed control system and when no speed limiting measures are taken to reduce the temperature of the electrical machine system due to thermal limitations in the vehicle.

Consequently, according to the invention, the heat development in the components of the electrical machine is decreased when the vehicle is travelling in the downhill road section since the power applied by the electrical machine system is reduced. Moreover, since the travelling time in the downhill road section is increased, the components of the electrical machine may be more efficiently cooled. Thus, the electrical machine system will have a generally lower temperature when the vehicle reaches the uphill road section compared to if the first vehicle speed was maintained. This may reduce the risk of overheating of the components of the electrical machine when driving in the uphill road section since a higher heat development is allowed prior to the system becoming overheated.

In an embodiment of the invention, the temperature limit is a temperature above which the power applied by the electrical machine system must be reduced to avoid overheating of the electrical machine system.

Hereby, the temperature limit may be set based on thermal limitations of a specific vehicle. Thus, the speed of the vehicle may be allowed to deviate from the first vehicle speed level only in situations when there is a risk of component overheating.

Hereby, unnecessary vehicle speed decrease in downhill road sections is avoided leading to decreased trip-time.

In an embodiment of the invention, the determining of whether the temperature of the electrical machine system will exceed the temperature limit in the uphill road section is at least partly based on one or more from the group of: road inclination of the downhill road section, road inclination of the uphill road section, a length of the downhill road section, a length of the uphill road section, a topology of the upcoming road section and/or speed limitations on the upcoming road section.

Thus, a reliable method for controlling the speed of the vehicle is obtained where the temperature of the electrical machine system may be reliably predicted.

In an embodiment of the invention, the determining whether a temperature of the electrical machine system will exceed a temperature limit in the uphill road section is further based on a thermal model of the electrical machine system.

By determining whether a temperature of the electrical machine system will exceed a temperature limit in the uphill road section based on a thermal model of the electrical machine system, the temperature of the electrical machine system may be determined in an accurate manner for different types of vehicles.

Hereby, the electrical machine system may be controlled in an accurate way mitigating component aging, decreased efficiency of the electrical machine system and decreased vehicle drivability.

In an embodiment of the invention, the thermal model takes into account at least heat developed by the electrical machine system applying power and cooling of the electrical machine system, e.g., by a cooling system and/or ambient air to determine changes in temperature of the electrical machine system.

Hereby, the electrical machine system can be controlled in a safe way, limiting the wear on the components of the electrical machine system, and mitigating the risk of decreased lifetime of the electrical machine system.

In an embodiment of the invention, the determining whether a temperature of the electrical machine system will exceed a temperature limit is further based on at least one vehicle parameter, the at least one vehicle parameter comprising at least a representation of a weight of the vehicle.

Hereby, the temperature of the electrical machine system can be determined in a precise manner taking into consideration vehicle related information which may impact the thermal characteristics of the electrical machine system.

In an embodiment of the invention, the second vehicle speed may change dynamically along the downhill road section.

By controlling the second vehicle speed to change dynamically along the downhill road section, the speed of the vehicle may be dynamically adapted to the road topology. For example, a higher vehicle speed may be allowed when the steepness of the downhill is reduced, and thereby the need for brake power. Conversely, in steep downhill, the speed may be decreased to prolong the travel time in the downhill and thereby reduce the average brake power in the downhill. Since energy recovery is generally more efficient when performed at lower power and when performed during an increased time duration, the regeneration of the regenerative brake system may hereby be optimized such that more energy is recovered.

In an embodiment of the invention, the reducing of the first vehicle speed in the downhill road section comprises reducing the first vehicle speed such that the temperature of the electrical machine system is kept at or below the temperature limit in the uphill road section.

Hereby, speed reduction in the uphill road section is avoided.

In an embodiment of the invention, the method further comprises, when it is determined that the temperature will exceed the temperature limit in the uphill road section:
  determining a required increase of the travelling time in the downhill road section at least partly based on one or more of: the road inclination of the downhill road section, the length of the downhill road section, the thermal model of the electrical machine system, and/or the weight of the vehicle, and
  reducing the first vehicle speed to a second vehicle speed in the downhill road section such that the travelling time in the downhill road section corresponds to the determined required increase if the travelling time.

Herby, the required increase of the travelling time may be determined in a precise manner for different types of vehicles and different road conditions and the speed of the vehicle may be controlled to avoid overheating in the electrical machine system and achieve increased energy efficiency.

In an embodiment of the invention, the method further comprises, when it is determined that the temperature will exceed the temperature limit in the uphill road section:
  determining the required increase of the travelling time in the downhill road section such that the increase in travelling time in the downhill road section at most amounts to the travelling time increase that would be caused by the electrical machine system reaching the temperature limit in the uphill road section if the first vehicle speed would have been maintained in the downhill road section, and
  reducing the first vehicle speed to a second vehicle speed in the downhill road section such that the travelling time in the downhill road section corresponds to the determined required increase of the travelling time.

Hereby, it can be ensured that overall travelling time is not increased. If the electrical machine system reaches a temperature limit the power is in general reduced with the result being a loss of vehicle speed and a prolonged travelling time. According to the embodiment, it may be ensured that the increased travelling time in the downhill does not exceed the otherwise resulting loss in time in the uphill.

In an embodiment of the invention, the method further comprises:

reducing the first vehicle speed to a second vehicle speed in the downhill road section such that the total brake energy that would have been applied in the downhill road section to maintain a first vehicle speed is applied during the increased travelling time such that a peak brake power is reduced.

Hereby, the temperature in the electrical machine system is decreased and energy regeneration in the vehicle optimized.

According to a second aspect, the invention relates to a control arrangement for controlling a speed of a vehicle in a downhill road section followed by an uphill road section, the vehicle comprising an electrical machine system being configured to apply a brake power for braking the vehicle to maintain a first vehicle speed in the downhill road section, and to apply a propelling power for propelling the vehicle the control arrangement being configured to:

determine whether a temperature of the electrical machine system will exceed a temperature limit in the uphill road section, if maintaining the first vehicle speed in the downhill road section, and reduce the first vehicle speed to a second vehicle speed in the downhill road section such that, in comparison to when the first vehicle speed would have been maintained, the temperature of the electrical machine system is decreased when the vehicle reaches the uphill road section resulting from a travelling time in the downhill road section being increased.

It will be appreciated that all the embodiments described for the method aspects of the invention are applicable also to at least one of the control arrangement aspects of the invention. Thus, all the embodiments described for the method aspects of the invention may be performed by the control arrangement, which may also be a control device, i.e. a device. The control arrangement and its embodiments have advantages corresponding to the advantages mentioned above for the methods and their embodiments.

According to a third aspect of the invention, aforementioned and further objectives are achieved through a vehicle comprising the control arrangement of the second aspect. The vehicle may for example be a bus, a truck, or a car.

According to a fourth aspect, the invention relates to a computer program comprising instructions which, when the program is executed by a computer, cause the computer to carry out the method according to the first aspect.

According to a fifth aspect, the invention relates to a computer-readable medium comprising instructions which, when executed by a computer, cause the computer to carry out the method according to the first aspect.

The above-mentioned features and embodiments of the method, the control arrangement, the vehicle, the computer program, and the computer-readable medium, respectively, may be combined in various possible ways providing further advantageous embodiments.

Further advantageous embodiments of the method, the control arrangement, the vehicle, the computer program, and the computer-readable medium according to the present invention and further advantages with the embodiments of the present invention emerge from the detailed description of embodiments.

BRIEF DESCRIPTION OF THE DRAWINGS

Embodiments of the invention will be illustrated in more detail below, along with the enclosed drawings, where similar references are used for similar parts, and where.

DETAILED DESCRIPTION

An electrical machine system is used to propel and brake an electric vehicle. The electrical machine system comprises one or more electrical machines used to provide both brake and propelling power to control the speed of an electric vehicle and one or more batteries which are charged and discharged during braking and propelling of the vehicle. This leads to heat being developed in the electrical machine system, both during propelling and braking. In hilly terrain, with frequent variations between uphill and downhill, there is a risk of overheating in one or more components of the electrical machine system, such as the electrical machine and batteries.

Today, in modern vehicles, the operating temperature of various components of an electric machine system are often monitored. In situations when an operating temperature exceeds a desired temperature limit, a common solution is to reduce the load on the electric machine system, e.g., by electronically limiting its power output. The torque generated by the electrical machine system is thereby reduced which may lead to a necessary reduction of the vehicle speed or even to a braking of the vehicle to a standstill. However, this solution reduces the overall performance of the vehicle, which may not be desirable since it may adversely affect the trip time of the vehicle.

It is thus an objective of the present invention to provide a method and a control arrangement for controlling a speed of a vehicle such that these problems are at least partly solved.

Figure 1:
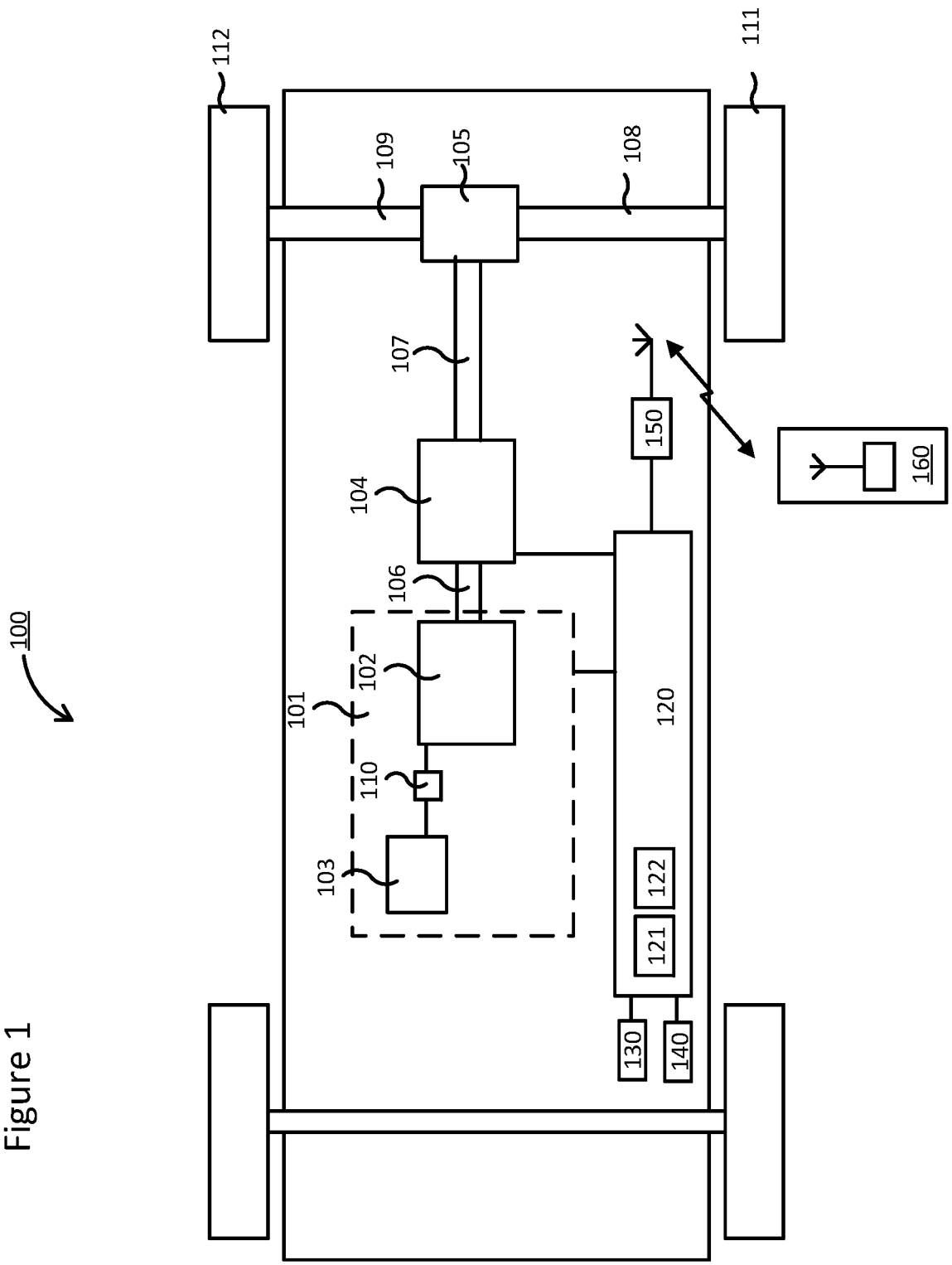
FIG. 1 shows a schematic view illustrating an exemplary vehicle in which embodiments of the present invention may be implemented.

FIG. 1, which will be used to explain the herein presented embodiments, schematically illustrates a vehicle 100. The vehicle 100 may e.g., be a car, a bus, or a truck. The vehicle 100 illustrated in FIG. 1 comprises an electrical machine system 101 with at least one electrical machine 102 configured for driving the drive wheels 111, 112 of the vehicle 100. In the shown embodiment, the vehicle 100 comprises two driving wheels 111, 112, but it should be understood that the vehicle 100 may be arranged with one or more driving wheels. The at least one electrical machine 102 may, as depicted in FIG. 1, be connected to a gearbox 104 via an input shaft 106. The vehicle 100 may comprise a propeller shaft 107 from the gearbox 104 which drives the driving wheels 111, 112 via a central gear 105, for example a conventional differential, and two drive shafts 108, 109 of the vehicle 100. It should be understood that the vehicle 100 may be arranged in any known way, for example without a gearbox 104 or conventional differential without limiting the scope of the invention.

The at least one electrical machine 102 may be arranged essentially anywhere, as long as torque is provided to one or more of the driving wheels of the vehicle, for example adjacent to one or more of the wheels, or in any other conventional way as is understood by a skilled person. The at least one electrical machine 102 may be provided with electrical power from a battery system 103 via a power electronic module 110, both included in the electrical machine system 101 of the vehicle 100. The battery system 103 may in one example comprise an electrical battery unit or a plurality of electrical battery units. The power electronic module 110 converts the DC voltage provided by the battery unit to voltage demanded by the electrical machine, typically a three phase AC voltage.

The vehicle 100 may be a pure electric vehicle and only include electrical machine 102 for driving the drive wheels 111, 112 of the vehicle 100. However, the vehicle 100 may be a so-called hybrid vehicle and also include an internal combustion engine (not illustrated in FIG. 1), which may in a conventional manner by connected to the gearbox 104 via a clutch (not illustrated in FIG. 1).

The electrical machine system 101 is controlled by a vehicle control system via a control arrangement 120. The control arrangement 120 may be distributed on several control units configured to control different parts of the vehicle 100. The control arrangement 120 may e.g. include a determining unit 121, and a reducing unit 122 arranged for performing the method steps of the disclosed invention as is explained further on. The control arrangement 120 and/or another control arrangement may further be configured for controlling any other units/devices/entities of the vehicle 100. However, in FIG. 1, only the units/devices/entities of the vehicle useful for understanding the present invention are illustrated. The control arrangement 120 will be described in further detail in FIG. 4.

The vehicle 100 may further include one or more sensors 130, e.g. at least one camera located at suitable positions within the vehicle 100.

Further, the vehicle 100 may comprise a positioning system/unit 140. The positioning unit 140 may be based on a satellite navigation system such as the Navigation Signal Timing and Ranging (Navstar), Global Positioning System (GPS), Differential GPS (DGPS), Galeo, GLONASS, or the like. Thus, the positioning unit 140 may comprise a GPS receiver.

The vehicle 100 may further include at least one communication device 150 arranged for communication with at least one entity 160 external to the vehicle 100, such as at least one communication entity of another vehicle. Correspondingly, the at least one communication device 150 may be a vehicle-to-vehicle (V2V) communication device, a vehicle-to-infrastructure (V2I) communication device, a vehicle-to-everything (V2X) communication device, and/or a wireless communication device such that communication between the vehicle and the at least one external entity 160 is achieved/provided.

The proposed invention will now be described with reference to a method 200, disclosed in FIG. 2a, for controlling a speed of a vehicle, such as the vehicle 100 disclosed in FIG. 1, in a downhill road section followed by an uphill road section. The vehicle 100 comprises an electrical machine system 101 being configured to apply a brake power for braking the vehicle 100 to maintain a first vehicle speed in the downhill road section, and to apply a propelling power for propelling the vehicle 100 in the uphill road section.

Figure 2A:
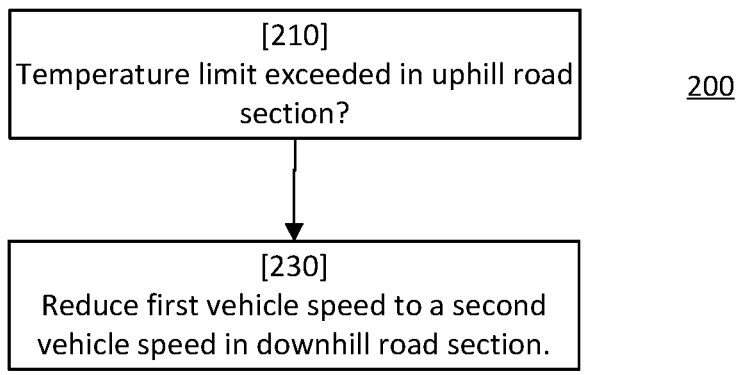
FIG. 2a shows a flow chart of a method for controlling a speed of a vehicle according to embodiments of the invention.

The method 200 comprises in step 210 in FIG. 2a, determining whether a temperature of the electrical machine system will exceed a temperature limit $T_{lim}$ in the uphill road section, if maintaining the first vehicle speed in the downhill road section, and when it is determined that the temperature will exceed the temperature limit $T_{lim}$ in the uphill road section.

The method further comprises in step 230 in FIG. 2a, reducing the first vehicle speed to a second vehicle speed in the downhill road section such that, in comparison to when the first vehicle speed would have been maintained, the temperature of the electrical machine system 101 is decreased when the vehicle 100 reaches the uphill road section, resulting from a travelling time in the downhill road section being increased.

It is to be understood that the method 200 may be employed on substantially all types of vehicles powered by an electrical machine system 101 and where the propelling and brake power for propulsion and braking of the vehicle is generated by one or more electrical machines 102.

The method of the invention may be applied in a downhill road section followed by an uphill road section where the speed of the vehicle 100 is controlled automatically by controlling the vehicle's electrical machine system 101 to provide a brake power in the downhill road section and propelling power in the uphill road section required to achieve a desired speed. A downhill road section is a road section where a vehicle is subjected to an accelerating force by gravity. An uphill road section is here a road section where a propelling power needs to be applied by a vehicle's traction unit, such as the vehicle's electrical machine system 101, to maintain a speed of a vehicle, i.e., when the vehicle is not accelerated by gravity.

Such automatic speed control may be carried out by cruise control. Cruise control is often conducted in vehicles by two interacting systems, a cruise control function which demands a propelling power from the vehicle's traction unit and a downhill speed control which prevents the vehicle from developing excessive speed, particularly when driving downhill by applying a brake power.

The invention modifies the strategy of the vehicle speed and by changing the power generated in the electrical machine system 101 to reduce the amount of heat developed in the electrical machine system 101 during braking in the downhill road section by means of the electrical machine system 101 when determined that there is a risk of overheating one or more components in the electrical machine system 101 in the following uphill road section. This is done by lowering the vehicle speed in the downhill road section which leads to lower brake power and power outtake from the electrical machine system 101 since brake power is proportional to the brake force and the vehicle speed. By reducing the brake power the heat losses in the electrical machine system 101, are reduced due to lower current supplied to the batteries during braking when energy is regenerated, and batteries charged. Moreover, heat losses during a battery charging cycle are greater than heat losses during the discharging cycle. Thus, reducing heat losses by reducing the brake power is more efficient than by reducing the propelling power in the following uphill road section. Lower speed also increases the travelling time in the downhill road section and thus the time being available to cool the components of the electrical machine system 101 will be longer.

The invention aims thus at reducing the heat increase in the electrical machine system 101 by reduce the heat developed in the components of the electrical machine system 101 and increase the time for cooling of the components. This could be done by reducing the power generated by the electric machine system, which may be achieved by reducing the speed of the vehicle. The physical motivation of applying the method of the invention may be given by the following relations.

In order for the vehicle not to accelerate in the downhill a force F is needed, where this force F can be determined as the opposite of the total forces otherwise acting on the vehicle. This force requires a power given by the following formula:

$P_{vehicle} = F*v$, where:

$P_{vehicle}$ is power generated by the electric machine system of the vehicle,
F is brake or propelling force applied by the electric machine system, and
v is the vehicle speed.

Since the power $P_{vehicle}$ is generated electronically, it is given by the relation:

$P_{vehicle} = U*I$, where:

$P_{vehicle}$ is power generated by the electric machine system of the vehicle,
U is applied voltage, and
I is electric current.

The power of heat development in electric components due to electrical losses is given by the relation:

$P_{heat} = R*I^2$, where:

$P_{heat}$ is the power of thermal energy/heat,
R is electric resistance, and
I is electric current.

Thus, an increased velocity yields a proportional increase in electric current. This in turn yields heat losses that are proportional to the square of the electric current. Consequently, lower velocity yields greater efficiency of the electric machine.

In addition, a decreased velocity also leads to a greater time for cooling down the components, since:

$t = s/v$, where:

t is time,
s is the distance of the downhill road section, and
v is velocity of the vehicle.

A main advantage of increasing the time t of driving in the downhill is that the total cooling energy $E_{cooling}$ from the vehicle's cooling system might increase because it is related to the cooling power $P_{cooling}$ by:

$E_{cooling} = P_{cooling}*t$, where:

$E_{cooling}$ is cooling energy,
$P_{cooling}$ is cooling power, and
t is time.

This might lead to a reduction of the net heat energy $E_{net\_heat}$ in the electric components since $E_{net\_heat} = E_{heat} - E_{cooling}$, where:

$E_{net\_heat}$ is net heat energy,
$E_{heat}$ is heat energy, and
$E_{cooling}$ is cooling energy.

Figure 2B:
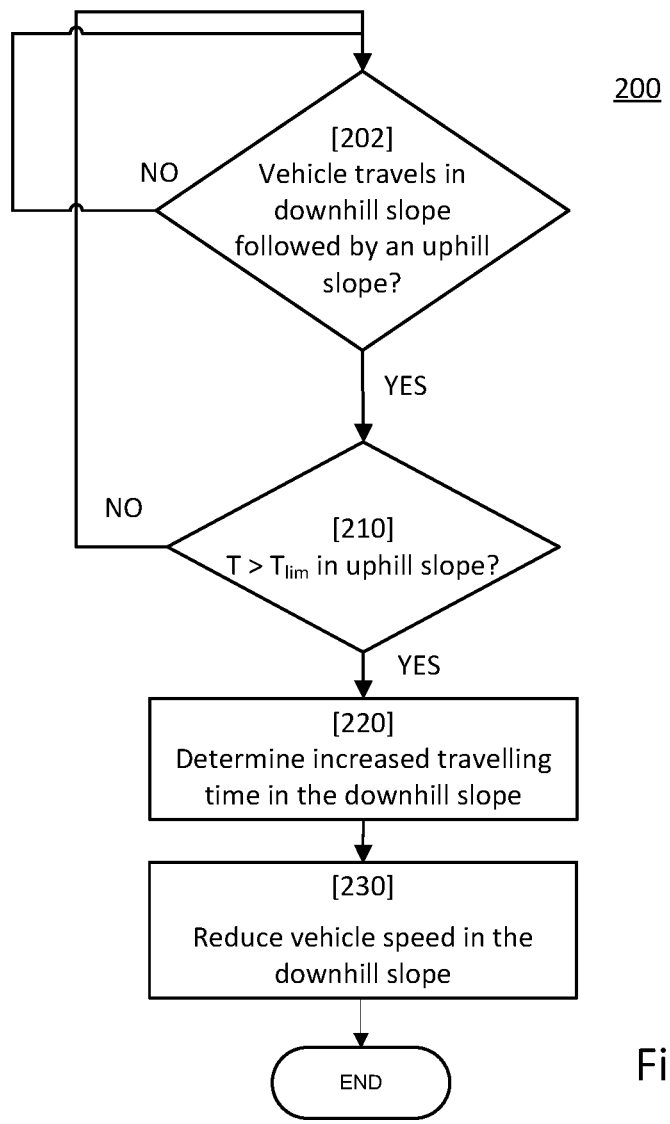
FIG. 2b shows a flow chart of a method for controlling a speed of a vehicle according to further embodiments of the invention.

In addition to the method steps 210-230 described with reference to FIG. 2a the method according to the invention may, in embodiments, comprise further optional steps. Embodiments of the invention will now be explained more in detail with reference to FIG. 2b. FIG. 2b discloses a flowchart of the method 200 comprising the method steps 210-230 described with reference to FIG. 2a and further optional steps. It should be noted that the method steps illustrated in FIG. 2b and described herein do not necessarily have to be executed in the order illustrated in FIG. 2b. The steps may essentially be executed in any suitable order, as long as the physical requirements and the information needed to execute each method step is available when the step is executed.

In step 202 of method 200 in FIG. 2b, it is determined if the vehicle is traveling in a downhill road section followed by an uphill road section where the method 200 of the invention may be applied.

Figure 3A:
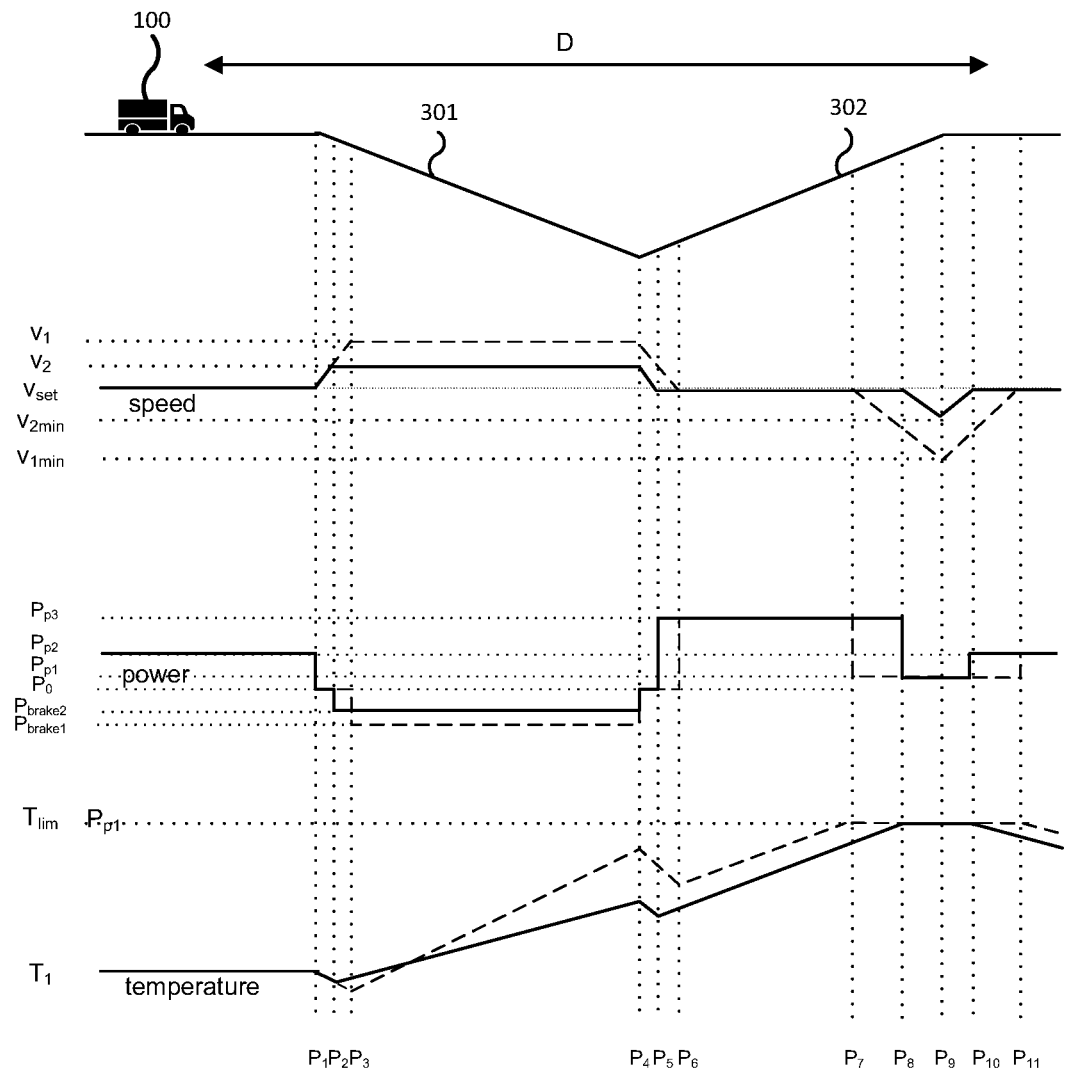
FIG. 3a illustrates the principle of one embodiment of the invention in one driving situation.

A downhill road section followed by an uphill road section may in one example be understood as a downward or declining gradient followed by an uphill road section detected by the vehicle 100 as illustrated in FIG. 3a.

FIG. 3a illustrates a driving scenario, where the aspects of the inventive method 200 may be implemented. At the top of FIG. 3a a driving route of a vehicle, such as the vehicle 100 disclosed in FIG. 1, is shown. Thus, the FIG. 3a shows the vehicle 100 approaching a downhill road section 301 followed by an uphill road section 302.

The downhill road section 301 illustrated in FIG. 3a is immediately followed by an uphill road section 302. However, it should be noted that the uphill road section 302 does not necessarily need to immediately follow the downhill road section 301 but rather be an uphill road section following the downhill road section within a distance from the vehicle, wherein the road section between the downhill road section and the uphill road section may comprise one or more of further declining gradients and further uphill road sections. The distance from the vehicle 100, which may be a distance within which a following uphill road section may be detected in the vehicle 100 is illustrated in FIG. 3a as the distance D.

The distance D may in one example be related to the temperature of the electrical machine system 101 and correspond to a distance to a following uphill road section reached prior to the temperature of the electrical machine system 101 has decreased to a temperature threshold value. The temperature threshold may, in one example correspond to a preset temperature value. In another example, temperature threshold may correspond to the temperature of the electrical machine system 101 at the position when the vehicle entered the downhill road section 301.

In another example, the distance D may be a predetermined distance within which the topology of the road in front of the vehicle, including road gradients, may be detected in the vehicle 100. The distance D may in one example be a distance preconfigured in the vehicle's control system and be e.g., based on how the following uphill section is detected in the vehicle.

In one example, the topology of the road in front of the vehicle 100 may be detected by means of one or more sensors 130 which may be included in the vehicle 100 such as one or more camera or one or more radar. When the topology of the road in front of the vehicle is detected by the one or more sensors 130, the distance D may be restricted by the range of the sensor, i.e., by the distance the sensor is able to detect the topology of the road in front of the vehicle.

In another example, the following uphill section may be detected based on map data, e.g. from digital maps available in the vehicle 100 including e.g. topographical information, in combination with positioning information, e.g. GPS information. The positioning information may be used to determine the location of the vehicle relative to the map data so that the road section information may be extracted from the map data.

In yet another example, the following uphill road section may be detected by means of at least one other vehicle in front the vehicle 100 and communicated, e.g., via the at least one communication device 150 to the vehicle 100 using V2V communication. The downhill road section may also be detected by a nearby infrastructure device and communicated to the vehicle 100 using e.g. V2I communication.

If it is determined that the vehicle 100 is traveling in a downhill road section followed by an uphill road section. i.e., 'Yes' in step 202, the method 200 continues to step 210, otherwise, i.e., 'No' in step 202, the method 200 returns back to step 202, or is ended. Previous known automatic downhill speed controls which may be used to control the speed of vehicles traveling in a downhill road section, base their function on how an actual speed of the vehicle is related to the predefined maximum downhill speed, in such a way that a brake power is applied when the predefined maximum downhill speed is reached. The brake power is then continued to be applied so that the predefined maximum downhill speed is maintained.

The speed control of a vehicle traveling in a downhill road section followed by an uphill road section according to previously known methods as well as to the inventive method 200 may be explained in more detail with reference to FIG. 3a showing a plot of the vehicle speed when the vehicle 100 drives through the route disclosed in the upper part of the figure. The speed plot is shown in the middle section of the figure and denoted as "speed". FIG. 3a also shows plots of a temperature of the vehicle's electrical machine system 101 and a plot of the power generated by the electrical machine system 101 in the lower section of the figure, denoted as "temperature" and "power".

The temperature of the vehicle's electrical machine system 101 may in this disclosure be understood as a temperature of at least one component of the electrical machine system 101. The at least one component may here relate to a component in which a too hight temperature may lead to shorter lifetime, efficiency degradation or component failure. Examples of such components may comprise stator and/or rotor windings, power electronics module, permanent magnets of the electrical machine 102, a battery cell in the battery system 103, etc.

The driving situation illustrated in FIG. 3a is described in terms of positions such as P1, P2, etc.

As illustrated in FIG. 3a, the original speed of the vehicle 100 prior entering the downhill speed section may correspond to a set speed of the cruise control function and is in FIG. 3a denoted as $v_{set}$. As previously explained, the temperature of the vehicle's electrical machine system 101 may vary over time mainly depending on the power applied by the electrical machine system when a propelling or a brake power is provided by the electrical machine system 101 when the vehicle is in motion. Electric vehicles generally comprise a cooling system for cooling the components of the electrical machine system 101 when needed and are generally dimensioned to withstand high power demand. Thus, prior to entering the downhill road section 301, when the speed of the vehicle is substantially constant, the temperature of the vehicle's electrical machine system 101 may be kept at a constant level $T_1$, since the heat generated due to the propelling power, denoted in FIG. 3a as $P_{p2}$, applied to maintain the original speed of the vehicle is not higher than what is capable to be cooled by the cooling system in the vehicle and/or ambient air. However, when the power demand and thereby heat development, is higher than the cooling capacity of the vehicle's cooling system, parts of the electrical machine system may become overheated.

As previously explained, the vehicle 100 may be configured to maintain a first vehicle speed $v_1$ when driving downhill. As illustrated in FIG. 3a, at the first position P1, the vehicle enters the downhill road section 301 and is accelerated by gravity from its original speed $v_{set}$. Normally, when the vehicle is accelerated by gravity before the first vehicle speed $v_1$ has been reached, no propelling or brake power is applied by the electrical machine system 101. $P_0$ in FIG. 3 corresponds to no power being applied by the electrical machine system 101. Thus the temperature of the vehicle's electrical machine system 101 may be reduced between the position $P_1$ and the position $P_3$ as illustrated in FIG. 3a.

According to previously known methods, when the vehicle 100 has reached the first vehicle speed $v_1$ at the position $P_3$ in FIG. 3a, the first vehicle speed $v_1$ is maintained e.g., by applying a brake power, denoted as $P_{brake1}$, by means of the electrical machine system 101. The brake power $P_{brake1}$ is then continued to be applied until the vehicle 100 has reached the end of the downhill section 301 at the position $P_4$. Thus, when the first vehicle speed $v_1$ has been reached, it is maintained throughout the entire stretch of the downhill section 301 as is illustrated in FIG. 3a by the dashed plot speed between the positions $P_1$ and $P_4$. When the brake power $P_{brake1}$ is applied by the electrical machine system 101, i.e., between the position $P_3$ and the position $P_4$ in FIG. 3a, the temperature of the vehicle's electrical machine system 101 increases as illustrated by the dashed temperature plot.

In the driving situation in FIG. 3a, the downhill road section 301 is followed by an uphill road section 302 which is entered by the vehicle at the position $P_4$. The applied brake force is here released ($P_0$ in FIG. 3), and the vehicle 100 speed can again decrease to reach the original speed at the sixths position $P_6$ maintained prior to entering the downhill section 301. Thus, between the position $P_4$ and the position $P_6$, no power is provided by the electrical machine system 101. The temperature of the vehicle's electrical machine system 101 may once again be reduced as illustrated in FIG. 3a by the dashed plot between the position $P_4$ and the position $P_6$.

Once the original speed $v_{set}$ has been reached at the position $P_6$ in FIG. 3a, it is maintained in the uphill road section by applying a propelling power $P_{p3}$ by means of the electrical machine system 101. The heat developed in the electrical machine system 101 may be higher than what is capable to be cooled by the cooling system in the vehicle 100 and thus, the temperature of the vehicle's electrical machine system 101 may once again increase as illustrated by the dashed temperature plot between the position $P_6$ and the position $P_7$.

As previously explained, an electrical machine system 101 in a motor vehicle 100 will operate efficiently and safely when its operating temperature is within its safe operating temperature. A safe operating temperature is often limited by a temperature threshold value $T_{lim}$ as illustrated in FIG. 3a.

The temperature threshold $T_{lim}$ may vary depending on which component of the machine system is considered. The temperature threshold $T_{lim}$ of a component or a system may represent a maximum allowed operating temperature of the component or the system or consist of different limits for different components, where the first limit to be reached will also impose a limit om the rest of the electrical machine system 101.

When reaching temperatures above the safe operating temperature, the wear on the electrical machine system 101 and its components may increase which may lead to decreased component lifetime or even to a component failure. Moreover, the degree of damage or wear on the component that occurs when the temperature threshold of the component is exceeded depends on component type, how much the temperature is exceeded and how long time the temperature is exceeded.

In case the power of the electrical machine system 101 increases such that the cooling capacity of the vehicle's cooling system is exceeded over a sufficiently long period of time, the temperature of the vehicle's electrical machine system 101 may hit the temperature threshold $T_{lim}$. Such a scenario is illustrated in FIG. 3a where, at the position $P_7$, the temperature threshold is reached. As previously explained, according to previously known methods, when the temperature threshold $T_{lim}$ has been reached the load on the electric machine system 101 is decreased e.g. by electronically limiting its power to a level denoted as $P_{p1}$ in FIG. 3a. The torque generated by the electrical machine system is thereby reduced leading to reduced vehicle speed from the original speed $v_{set}$ to a reduced speed denoted as $v_{1min}$ in FIG. 3a between the position $P_7$ and the position $P_{11}$, as illustrated by the dashed speed plot. The speed reduction is thus performed such that the temperature threshold $T_{lim}$ is not exceeded in the uphill road section. It should be understood that if the power output of the electric machine system 101 would not be limited when the temperature threshold $T_{lim}$ is reached, and the original speed $v_{set}$ be maintained also after the temperature threshold $T_{lim}$ is met, i.e., between the position $P_7$ and the position $P_{11}$, the temperature of the electric machine system 101 would exceed the temperature threshold $T_{lim}$ which may lead to overheating or even failure of electric machine system 101.

At the position $P_9$ in FIG. 3a, the vehicle 100 reaches the end of the uphill road section, which means that by maintaining the power $P_{p1}$ applied by electrical machine system 101 such that the temperature threshold $T_{lim}$ is not exceeded, the speed of the vehicle will increase reaching the original speed $v_{set}$ at the position $P_{11}$. The applied propelling may now be reduced to a level denoted as $P_{p2}$ in FIG. 3a, to maintain the original speed $v_{set}$ leading to a temperature decrease in the electrical machine system 101 as illustrated in the temperature plot at the position $P_{11}$.

Thus, when the vehicle speed is controlled according to previously known methods, the speed of the vehicle may be severely restricted due to high power generated by the electrical machine system 101 and high temperature in the electrical machine system 101.

The method 200 according to the invention controls the speed of the vehicle 100 by instead, in step 210 of method 200 as shown in FIG. 2b, determining whether a temperature of the electrical machine system 101 will exceed the temperature limit $T_{lim}$ in the uphill road section 302, if first vehicle speed $v_1$ is maintained in the downhill road section 301.

As previously explained, the temperature of the electrical machine system 101 exceeding a temperature limit $T_{lim}$ may be understood as the temperature of the electrical machine system 101 exceeding the temperature limit $T_{lim}$ when the vehicle speed is controlled automatically according to a speed profile, herein referred to as a configured speed profile, and when no speed limiting measures are taken to reduce the temperature of the electrical machine system 101 due to thermal limitations in the vehicle. The configured speed profile may correspond to a speed variation of the vehicle 100 when vehicle is configured to maintain a first vehicle speed $v_1$ in the downhill road section 301 and a set-speed of a cruise control $v_{set}$ in the following uphill road section 302. Moreover, the configured speed profile may take into account speed limitations due to legal speed limits on an upcoming road section and/or the upcoming road topology.

In an embodiment, the temperature limit $T_{lim}$ may be a temperature above which the power applied by the electrical machine system 101 must be reduced to avoid overheating of the electrical machine system 101.

Determining whether a temperature of the electrical machine system 101 will exceed the temperature limit $T_{lim}$ in the uphill road section 302 may be done by predicting a future power demand required from the electrical machine system 101 to propel the vehicle 100, maintaining a speed corresponding to the above mentioned configured speed profile, from the position of entering the downhill road section, i.e., the position $P_1$ in FIG. 3a until the end of the following uphill road section at the position $P_9$ in FIG. 3a, and based on the predicted power demand estimating a heat development in the electrical machine system 101. Based on the estimated heat development, a temperature profile of the electrical machine system 101 may be determined, and which may comprise temperature variation of one or more components of the electrical machine system 101 in the upcoming road section.

The future power demand required from the electrical machine system 101 may be predicted based on a number of parameters which have an impact on the temperature of the components of the electrical machine system 101. In an embodiment, the determining whether a temperature of the electrical machine system 101 will exceed the temperature limit $T_{lim}$ in the uphill road section 302 may be done based on information related to an upcoming road section such as road inclination of the downhill road section 301, road inclination of the uphill road section 302, a length of the downhill road section 301, a length of the uphill road section 302, a topology of the upcoming road section and/or speed limitations on the upcoming road section. Such information may be obtained from digital maps in combination with positioning information, e.g., global positioning system, GPS, information. The positioning information may be used to determine the location of the vehicle relative to the map data so that the road section information may be extracted from the map data. Various present-day cruise control systems use map data and positioning information. Such systems may then provide the system for the present invention with map data and positioning information. In one example, information associated with the upcoming road section can be received communication from at least one other vehicle. Such communication may e.g., be received by means of V2V communication, V2I communication, V2X communication, or similar. In another example, topographic information may be stored in the vehicle and retrieved in combination with positioning information. Information associated with the upcoming road section may, in yet another example, be obtained in the vehicle by means of onboard sensors and cameras or lidars collecting information associated with the upcoming road section.

By taking into account the above-mentioned information associated with the upcoming road section, an anticipated load on the electrical machine system 101 may be calculated corresponding to a propulsion power needed to propel the vehicle according to a speed profile. In one example the speed profile may correspond to the configured speed profile in the downhill road section 301 followed by the uphill road section 302. In another example, the speed profile may take into account the speed limitations valid on the upcoming road section and/or the road topology. For example, the vehicle may be configured to maintain 80 km/h, but the vehicle speed may be further limited by legal speed limits on the upcoming road section and/or a determined maximum speed that the vehicle is not to exceed on the upcoming road section due to road topology such as road curvature.

In an embodiment, the determining whether a temperature of the electrical machine system 101 will exceed the temperature limit $T_{lim}$ in the uphill road section 302 may further be based on at least one vehicle parameter. The at least one vehicle parameter may, in one example at least comprise a representation of a weight of the vehicle 101. For example, by using Newton's laws of motion the propelling or brake power corresponding to a load on the electrical machine system 101 may be calculated based on parameters like the vehicle's weight, speed, and the inclination of the road in front of the vehicle to mention a few. Vehicle parameters such as vehicle weight may be available in the control system of the vehicle 101 or may be determined according to conventional methods by means of one or more sensors 130 in the vehicle.

In an embodiment, the determining whether the temperature of the electrical machine will exceed the temperature limit $T_{lim}$ in the uphill road section may be further based on a thermal model of the electrical machine system 101. The thermal model may comprise theoretical models of the component's temperature as a function of the load on the electrical machine system 101. Thus, the temperature of the electrical machine system 101 may be calculated e.g., based on theoretical models of the component's temperature as a function of the determined load on the electrical machine system 101.

In an embodiment, the thermal model may take into account at least heat developed in the electrical machine system 101 applying a propelling or a brake power and cooling of the electrical machine by a cooling system to determine changes in the temperature of the electrical machine system 101.

As previously explained, in the driving scenario illustrated in FIG. 3a, the temperature limit $T_{lim}$ would have been exceeded in a vehicle driving with a speed corresponding to the above-mentioned configured speed profile in the uphill road section at the position $P_7$.

If it is determined that the temperature of the electrical machine system 101 will exceed the temperature limit $T_{lim}$ in the uphill road section 302, i.e., 'Yes' in step 210, the method 200 continues to step 230, otherwise, i.e., 'No' in step 210, the method 200 returns back to step 202, or is ended.

In step 230 of the method 200, the first vehicle speed $v_1$ is reduced to a second vehicle speed $v_2$ in the downhill road section 301. Thus, as illustrated in FIG. 3a, when the speed of the vehicle 100 has reached the second vehicle speed $v_2$ in the downhill road section 301 at the position $P_2$, the second vehicle speed $v_2$ is maintained in the downhill road section instead of maintaining the first vehicle speed $v_1$ which is illustrated by the solid speed plot. The second vehicle speed $v_2$ may be maintained by applying a brake power, e.g., the brake power $P_{brake2}$ as illustrated in FIG. 3a, by means of the electrical machine system 101.

Since the second vehicle speed $v_2$ is lower than the first vehicle speed $v_1$, the travelling time in the downhill road section 301 when the second vehicle speed $v_2$ is maintained is increased compared to when the first vehicle speed $v_1$ is maintained. Thus, the brake power $P_{brake2}$ applied to maintain the second vehicle speed $v_2$ is lower than the brake power $P_{brake1}$ that would have been required to maintain the first vehicle speed $v_1$ since the energy to be braked away in the downhill road section is spread over a longer period of time. Consequently, the heat development in the electrical machine system 101 is decreased when the vehicle is travelling in the downhill road section compared to what it would have been if the first vehicle speed $v_1$ was maintained as illustrated in FIG. 3a. Moreover, since the travelling time in the downhill road section is increased, the components of the electrical machine may be more efficiently cooled. Thus, when the second vehicle speed $v_2$ is maintained, i.e., between the position $P_2$ and the position $P_4$ in FIG. 3a, the temperature of the vehicle's electrical machine 101 increases as illustrated by the solid temperature plot. However, the temperature increase is lower compared to the temperature increase when the first vehicle speed $v_1$ would have been maintained as illustrated by the dashed temperature plot in FIG. 3a.

In one example, the first vehicle speed $v_1$ may be reduced such that the temperature of the electrical machine system 101 is decreased when the vehicle 100 reaches the uphill road section 302 and a travelling time in the downhill road section 301 is increased.

By decreasing the temperature of the electrical machine system 101 when the vehicle 100 enters the uphill road section 302, the temperature may be kept below the temperature limit $T_{lim}$ during a longer time in the uphill road section 302 compared to the previously known methods when maintaining the original speed $v_{set}$. Hence, the speed of the vehicle 100 in the uphill road section 302 may not need to be decreased as much as the speed decrease required according to previously known methods or may be avoided. Thus, as previously described, in the driving situation illustrated in FIG. 3a, when a propelling power $P_{p3}$ is applied in the uphill road section to maintain the original speed $v_{set}$, the temperature of the electrical machine system 101 increases.

However, due to the decreased temperature at the position when the vehicle 100 reaches the uphill road section 302, i.e., the position $P_4$, when the second vehicle speed $v_2$ is maintained in the downhill road section compared to previously known methods when the first vehicle speed $v_1$ is maintained, the temperature limit is not reached until the position $P_8$, i.e., at a later position compared to previously known methods. Thus, at the position $P_8$ the power of the electrical machine system 101 is reduced to a power level $P_{p1}$, to avoid exceeding the temperature limit $T_{lim}$, and the vehicle speed is lowered until reaching the end of the uphill road section at the position $P_9$ which means that by maintaining the power $P_{p1}$ applied by electrical machine system 101 such that the temperature threshold $T_{lim}$ is not exceeded, the speed of the vehicle will increase reaching the original speed $v_{set}$ at the position $P_{10}$ i.e., sooner compared to previously known methods. The applied propelling may now be reduced to a level denoted as $P_{p2}$ in FIG. 3a, to maintain the original speed $v_{set}$ leading to a temperature decrease in the electrical machine system 101 as illustrated in the temperature plot at the position $P_{10}$. As illustrated in FIG. 3a, the speed decrease in the uphill road section is reduced such that the minimum speed that is reached is increased from $v_{1min}$ to $v_{2min}$.

Moreover, by applying the method of the invention, the temperature of the electrical machine system 101 may be reduced compared to previously known methods also after the end of the uphill road section has been reached. As illustrated in FIG. 3a, the vehicle 100 reaches the original speed $v_{set}$ where the temperature of the electrical machine system 101 starts to decrease sooner compared to previously known methods. The reduced temperature may be advantageous during further travel of the vehicle. For example, when a brake or propelling power needs to be applied such that the temperature of the electrical machine system 101 is again increased a lower initial temperature is favourable.

Figure 3B:
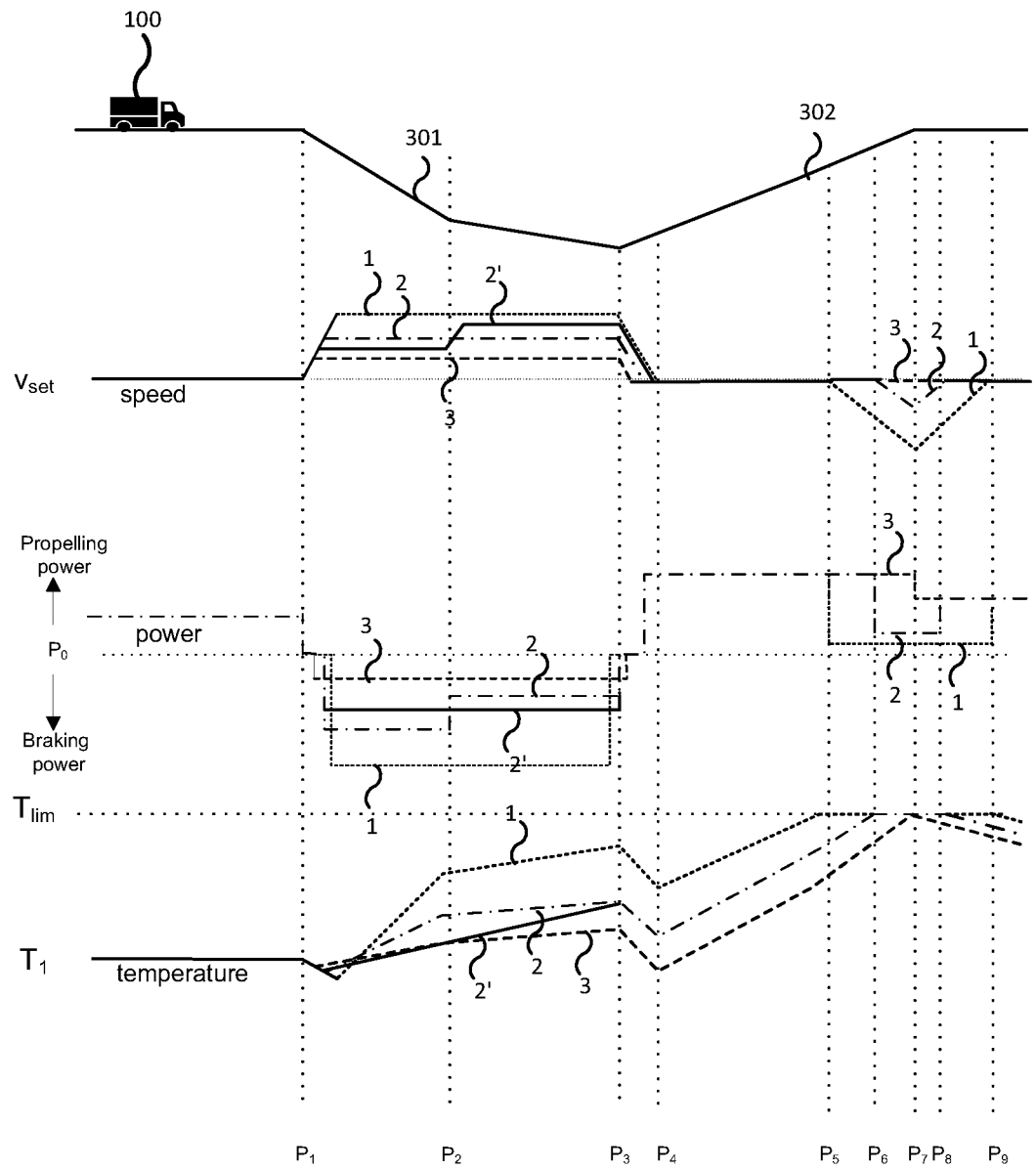
FIG. 3b illustrates the principle of further embodiments of the invention in one driving situation.

It should be understood that the size of the speed reduction from the first vehicle speed $v_1$ affects if or when the temperature limit $T_{lim}$ is reached. FIG. 3*b* illustrates a similar driving scenario as FIG. 3*a* and exemplifies how the vehicle speed in the uphill road section 302 may be affected by different vehicle speed levels in the downhill road section 301. Thus, FIG. 3*b* illustrated three different constant speed levels 1-3, the corresponding temperature plots 1-3 of the electrical machine system 101, and the resulting speed decrease 1-3 in the uphill road section 302. Thus, when vehicle speed according to plot 1 is maintained in the downhill road section, the temperature of the electrical machine system 101 increases such that the vehicle speed in the uphill road section needs to be reduced according to the plot 1. The speed decrease in the uphill road section 302 according to levels 2 and 3 respectively depend, in similar fashion of the maintained vehicle speed according to level 2 and 3, respectively, in the downhill road section 301.

In an embodiment, the first vehicle speed $v_1$ is reduced in step 230 of the method 200 such that the temperature of the electrical machine system 101 is kept at or below the temperature limit $T_{lim}$ in the uphill road section. Thus, as illustrated in FIG. 3*b*, reducing the vehicle speed in the downhill road to a level corresponding to level 3 in the FIG. 3*b* may eliminate the need of speed reduction in the uphill road section.

In FIG. 3*b*, the illustrated downhill road section comprises sections with different road inclinations. The second vehicle speed $v_2$ may in one example correspond to an average speed the vehicle 100 is maintaining in the downhill road section when the first vehicle speed has been reduced in step 230 of method 200. In one example, the second vehicle speed $v_2$ may correspond to a constant speed level lower than the first vehicle speed $v_1$ as illustrated in FIG. 3*b* by the speed plots 1, 2 and 3 in the downhill road section 301.

In an embodiment, the second vehicle speed $v_2$ may change dynamically along the downhill road section 301. The second speed $v_2$ of the vehicle 100 may for example depend on the inclination of the downhill road section and be achieved by keeping a constant brake power in the downhill road section. When the brake power applied by the electrical machine system 101 is kept at a constant level, the speed of the vehicle may vary when the inclination of the downhill road section varies. A vehicle speed changing dynamically along the downhill road section is illustrated in FIG. 3*b* by the speed plot 2'. FIG. 3*b* also shows plots of power applied by the electrical machine system 101. Thus, instead of maintaining a constant vehicle speed in the downhill road section 301 according to the speed plot 2 by applying a constant brake power 2, a variable speed according to the speed plot 2' may be maintained. In steep sections of the downhill road section 301, i.e., between the position $P_1$ and the position $P_2$, the speed of the vehicle may be maintained at a lower level than on the less steep sections, i.e., between the position $P_2$ and the position $P_3$. By applying a constant braking power in the downhill road section according to the power plot 2', the peak brake power is reduced, and energy regeneration may increase.

In an embodiment, the first vehicle speed $v_1$ may be reduced to a second vehicle speed $v_2$ in the downhill road section 301 such that a total brake energy that would have been applied in the downhill road section 301 to maintain a first vehicle speed $v_1$ is applied during the increased travelling time such that a peak brake power is reduced. Energy recovery is generally more efficient when performed at lower power. Thus, regeneration of the regenerative brake system may be optimized such that more energy is recovered.

The reduction of the first vehicle speed $v_1$ to the second vehicle speed $v_2$ in step 230 may be done based on a number of factors.

In an embodiment, reducing the first vehicle speed $v_1$ to the second vehicle speed $v_2$ in the downhill road section 301 may be done such that the travelling time in the downhill road section 301 may correspond to an increased travelling time. Thus, in an optional step 220 of method 200, preceding the step 230, the increased travelling time in the downhill road section 301 may be determined.

The increased travelling time may be determined such that when the vehicle 100 travels in the downhill road section 301 during the increased travelling time a required temperature level in the electrical machine system 101 is reached when the vehicle reaches the uphill road section 302.

In one example, the required temperature level may be lower compared to the temperature level that would have been reached if the first vehicle speed was maintained in the downhill road section 301.

The required temperature level may, in one example, correspond to an initial temperature in the uphill road section 302 such that the temperature of the electrical machine system 101 does not exceed the temperature limit $T_{lim}$ in the uphill road section 302 when the vehicle travels according to a configured speed profile. In another example, the required temperature level may correspond to an initial temperature in the uphill road section 302 such that the temperature of the electrical machine system 101 may exceed the temperature limit $T_{lim}$ in the uphill road section 302 during a predetermined time duration when the vehicle travels according to a configured speed profile.

The increased travelling time may at least partly be based on a number of parameters, i.e., the inclination of the downhill road section 301, a length of the downhill road section 301, the thermal model of the electrical machine system 101, and/or the weight of the vehicle and determined according to conventional methods. For example, by using Newton's laws of motion and taking into consideration the inclination and the length of the downhill road section as well as the weight of the vehicle 100, a load on the electrical machine system 101 may be calculated. The temperature of the electrical machine system 101 may be calculated e.g., based on theoretical models of the component's temperature as a function of the engine load.

By reducing the applied brake power by braking during a longer period of time in the downhill road section 310 compared to previously known methods, the speed of the vehicle 100 is reduced and the travelling time in the downhill road section is increased. This results in the temperature of the components being lower than otherwise would be the case so that the propelling power in the following uphill road section can be increased by allowing a higher temperature development so that the speed of the vehicle 100 is increased in and the travelling time in the uphill road section 320 is decreased. If the reduced travelling time in the downhill road section equals the increased travelling time in the uphill road section, the total energy efficiency in the vehicle is increased because, as previously explained, reducing brake power is more energy efficient than reducing propelling power.

Thus, in an embodiment, from an energy efficiency aspect, the required increase in traveling time in the downhill road section 301 may be determined to at most amount to the travelling time increase that would be caused by the electrical machine reaching the temperature limit $T_{lim}$ in the uphill road section 302 if the first vehicle speed would have been maintained in the downhill road section 301.

According to a non-limiting example the increased travelling time in the downhill road section 301 may be determined for the vehicle maintaining the configured speed profile, based on the increased travelling time of the vehicle 100 in the uphill road section 301 caused by the speed decrease due to the temperature of the electrical machine system 101 reaching a temperature limit $T_{lim}$ compared to the travelling time in the uphill road section 302 if no speed decrease was performed.

When the increased travelling time has been determined in the optional step 220, the vehicle speed may in step 230 be reduced to the second vehicle speed $v_2$ in the downhill road section 301 such that the travelling time in the downhill road section corresponds to or is less than the determined increased travelling time.

According to an aspect of the invention, a control arrangement 120 for controlling a speed of a vehicle 100 is presented. The control arrangement 120 includes means 121 arranged for determining whether a temperature of the electrical machine system will exceed a temperature limit $T_{lim}$ in the uphill road section 302, if maintaining the first vehicle speed $v_1$ in the downhill road section 301. Moreover, the control arrangement 120 includes means 122 arranged for reducing the first vehicle speed $v_1$ to a second vehicle speed $v_2$ in the downhill road section 301 such that, in comparison to when the first vehicle speed $v_1$ would have been maintained, the temperature of the electrical machine system 101 is decreased when the vehicle 100 reaches the uphill road section 302, resulting from an increased travelling time in the downhill road section 301.

The control arrangement 120, e.g. a device or a control device according to the invention may be arranged for performing all of the above, in the claims, and in the herein described embodiments method steps. The control arrangement 120 is hereby provided with the above-described advantages for each respective embodiment. The invention is also related to a vehicle 100 including the control arrangement 120.

Figure 4:
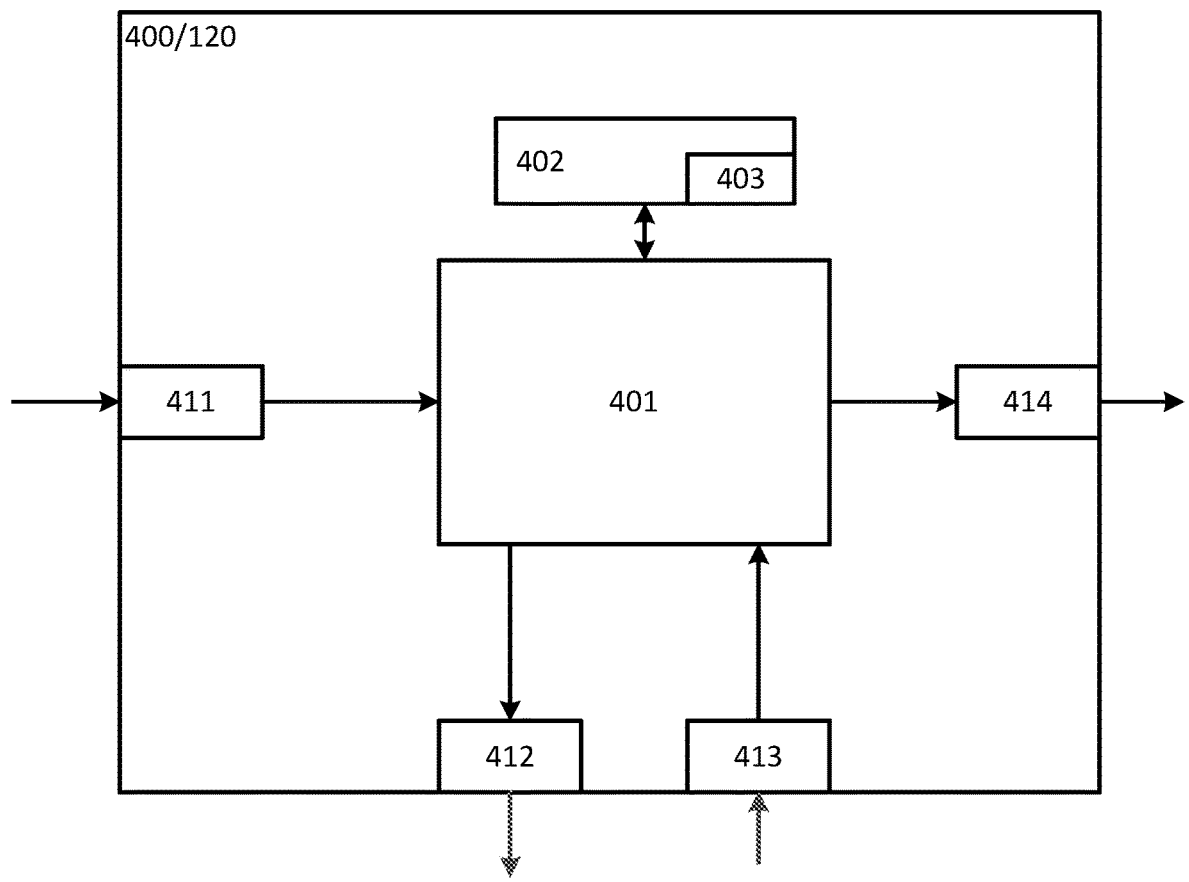
FIG. 4 shows a control arrangement, in which a method according to any one of the herein described embodiments may be implemented.

Now turning to FIG. 4 which illustrates the control arrangement 400/120, which may correspond to or may include the above-mentioned control units 121 and 122 i.e. the control unit performing the method steps of the disclosed invention. The control arrangement 400/120 comprises a computing unit 401, which can be constituted by essentially any suitable type of processor or microcomputer, e.g. a circuit for digital signal processing (Digital Signal Processor, DSP), or a circuit having a predetermined specific function (Application Specific Integrated Circuit, ASIC). The computing unit 401 is connected to a memory unit 402 arranged in the control arrangement 400/120, which memory unit provides the computing unit 401 with, e.g., the stored program code and/or the stored data which the computing unit 601 requires to be able to perform computations. The computing unit 401 is also arranged to store partial or final results of computations in the memory unit 402.

In addition, the control arrangement 400/120 is provided with devices 411, 412, 413, 414 for receiving and transmitting input and output signals. These input and output signals can contain waveforms, impulses, or other attributes which, by the devices 411, 413 for the reception of input signals, can be detected as information and can be converted into signals which can be processed by the computing unit 401. These signals are then made available to the computing unit 401. The devices 412, 414 for the transmission of output signals are arranged to convert signals received from the computing unit 401 in order to create output signals by, e.g., modulating the signals, which can be transmitted to other parts of and/or systems in the vehicle 100.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 401 and that the above-stated memory can be constituted by the memory unit 402.

Control systems in modern vehicles commonly comprise communication bus systems consisting of one or more communication buses for linking a number of electronic control units (ECU's), or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1 and 4, which is well known to the person skilled in the art within this technical field.

In a shown embodiment, the invention may be implemented by the above-mentioned control units 121 and 122. The invention can also, however, be implemented wholly or partially in one or more other control units already in the vehicle 100, or in some control unit dedicated to the invention.

Here and in this document, units are often described as being arranged for performing steps of the method according to the invention. This also includes that the units are designed to and/or configured to perform these method steps.

The control units 121 and 122 are in FIG. 1 illustrated as separate units. These units may, however, be logically separated but physically implemented in the same unit or can be both logically and physically arranged together. The units may e.g. correspond to groups of instructions, which can be in the form of programming code, that are input into, and are utilized by a processor/computing unit 401 when the unit is active and/or is utilized for performing its method step.

The person skilled in the art will appreciate that the herein described embodiments for controlling an engine may also be implemented in a computer program, which, when it is executed in a computer, instructs the computer to execute the method. The computer program is usually constituted by a computer program product 403 stored on a non-transitory/non-volatile digital storage medium, in which the computer program is incorporated in the computer-readable medium of the computer program product. The computer-readable medium comprises a suitable memory, such as, e.g.: ROM (Read-Only Memory), PROM (Programmable Read-Only Memory), EPROM (Erasable PROM), Flash memory, EEPROM (Electrically Erasable PROM), a hard disk unit, etc. The invention is not limited to the above-described embodiments. Instead, the invention relates to, and encompasses all different embodiments being included within the scope of the independent claims.

The invention claimed is:

1. A method performed by a control arrangement for controlling a speed of a vehicle in a downhill road section followed by an uphill road section, the vehicle comprising an electrical machine system being configured to apply a brake power for braking the vehicle to maintain a first vehicle speed in the downhill road section, and to apply a propelling power for propelling the vehicle in the uphill road section, the method comprising:
   determining whether a temperature of the electrical machine system will exceed a temperature limit in the uphill road section, if maintaining the first vehicle speed in the downhill road section; and
   when it is determined that the temperature will exceed the temperature limit in the uphill road section:
      reducing the first vehicle speed to a second vehicle speed in the downhill road section such that, in comparison to when the first vehicle speed would have been maintained, the temperature of the electrical machine system is decreased when the vehicle reaches the uphill road section, resulting from a travelling time in the downhill road section being increased.

2. The method according to claim 1, wherein the temperature limit is a temperature above which the power applied by the electrical machine system must be reduced to avoid overheating of the electrical machine system.

3. The method according to claim 1, wherein the determining of whether the temperature of the electrical machine system will exceed the temperature limit in the uphill road section is at least partly based on one or more from the group of: road inclination of the downhill road section, road inclination of the uphill road section, a length of the downhill road section, a length of the uphill road section, a topology of the upcoming road section, and/or speed limitations on the upcoming road section.

4. The method according to claim 3, wherein the determining whether a temperature of the electrical machine system will exceed a temperature limit in the uphill road section is further based on a thermal model of the electrical machine system.

5. The method according to claim 4, wherein the thermal model takes into account at least heat developed by the electrical machine system applying power and cooling of the electrical machine system to determine changes in temperature of the electrical machine system.

6. The method according to claim 3, wherein the determining whether a temperature of the electrical machine system will exceed a temperature limit is further based on at least one vehicle parameter, the at least one vehicle parameter comprising at least a representation of a weight of the vehicle.

7. The method according to claim 1, wherein the second vehicle speed may change dynamically along the downhill road section.

8. The method according to claim 1, wherein reducing the first vehicle speed in the downhill road section comprises reducing the first vehicle speed such that the temperature of the electrical machine system is kept at or below the temperature limit in the uphill road section.

9. The method according to claim 1, further comprising, when it is determined that the temperature will exceed the temperature limit in the uphill road section:
   determining a required increase of the travelling time in the downhill road section at least partly based on one or more of: the road inclination of the downhill road section, the length of the downhill road section, the thermal model of the electrical machine system, and/or the weight of the vehicle; and
   reducing the first vehicle speed to a second vehicle speed in the downhill road section such that the travelling time in the downhill road section corresponds to the determined required increase of travelling time.

10. The method according to claim 9, further comprising, when it is determined that the temperature will exceed the temperature limit in the uphill road section:
    determining the required increase of the travelling time in the downhill road section such that the increase in travelling time in the downhill road section at most amounts to the travelling time increase that would be caused by the electrical machine system reaching the temperature limit in the uphill road section if the first vehicle speed would have been maintained in the downhill road section; and
    reducing the first vehicle speed to a second vehicle speed in the downhill road section such that the travelling time in the downhill road section corresponds to the determined required increase of travelling time.

11. The method according to claim 1, further comprising:
    reducing the first vehicle speed to a second vehicle speed in the downhill road section such that the total brake energy that would have been applied in the downhill road section to maintain a first vehicle speed is applied during the travelling time in the downhill road section such that a peak brake power is reduced.

12. A control arrangement for controlling a speed of a vehicle in a downhill road section followed by an uphill road section, the vehicle comprising an electrical machine system being configured to apply a brake power for braking the vehicle to maintain a first vehicle speed in the downhill road section, and to apply a propelling power for propelling the vehicle, the control arrangement being configured to:
    determine whether a temperature of the electrical machine system will exceed a temperature limit in the uphill road section, if maintaining the first vehicle speed in the downhill road section; and
    reduce the first vehicle speed to a second vehicle speed in the downhill road section such that, in comparison to when the first vehicle speed would have been maintained, the temperature of the electrical machine system is decreased when the vehicle reaches the uphill road section, resulting from a travelling time in the downhill road section being increased.

13. A vehicle comprising:
    an electrical machine system being configured to apply a brake power for braking the vehicle to maintain a first vehicle speed in a downhill road section, and to apply a propelling power for propelling the vehicle; and
    a control arrangement for controlling a speed of a vehicle in the downhill road section followed by an uphill road section, the control arrangement being configured to:
       determine whether a temperature of the electrical machine system will exceed a temperature limit in the uphill road section, if maintaining the first vehicle speed in the downhill road section; and
       reduce the first vehicle speed to a second vehicle speed in the downhill road section such that, in comparison to when the first vehicle speed would have been maintained, the temperature of the electrical machine system is decreased when the vehicle reaches the uphill road section, resulting from a travelling time in the downhill road section being increased.

14. A computer program product comprising computer program code stored on a non-transitory computer-readable medium, said computer program code configured for controlling a speed of a vehicle in a downhill road section followed by an uphill road section, the vehicle comprising an electrical machine system being configured to apply a brake power for braking the vehicle to maintain a first vehicle speed in the downhill road section, and to apply a propelling power for propelling the vehicle in the uphill road section, said computer program code comprising computer instructions to cause at least one computing processor to perform the following operations:

determining whether a temperature of the electrical machine system will exceed a temperature limit in the uphill road section, if maintaining the first vehicle speed in the downhill road section; and when it is determined that the temperature will exceed the temperature limit in the uphill road section:

reducing the first vehicle speed to a second vehicle speed in the downhill road section such that, in comparison to when the first vehicle speed would have been maintained, the temperature of the electrical machine system is decreased when the vehicle reaches the uphill road section, resulting from a travelling time in the downhill road section being increased.

* * * * *